US005162712A

United States Patent [19]

Rockola et al.

[11] Patent Number: 5,162,712

[45] Date of Patent: Nov. 10, 1992

[54] OPTO-ELECTRIC CENTRAL SYSTEM FOR A REVERSIBLE ELECTRIC MOTOR

[75] Inventors: Donald C. Rockola, Chicago; Shuja Haque, Northbrook, both of Ill.

[73] Assignee: Rock-Ola Manufacturing Corporation, Addison, Ill.

[21] Appl. No.: 645,465

[22] Filed: Jan. 24, 1991

Related U.S. Application Data

[60] Division of Ser. No. 561,569, Aug. 6, 1990, Pat. No. 5,077,923, which is a continuation-in-part of Ser. No. 405,528, Sep. 7, 1989, abandoned.

[51] Int. Cl.[5] .............................................. H02P 3/00

[52] U.S. Cl. ................................... 318/280; 318/480; 318/265

[58] Field of Search ........................ 318/480, 280–286, 318/254, 138, 135, 439, 596, 577, 603, 616, 54, 65, 272, 266, 265, 466, 467

[56] References Cited

U.S. PATENT DOCUMENTS

| | | | |
|---|---|---|---|
| 3,808,485 | 4/1974 | Sarai et al. | 318/480 |
| 4,198,582 | 4/1980 | Matthias et al. | 318/135 X |
| 4,698,567 | 10/1987 | Gottwald et al. | 318/480 |
| 4,736,140 | 4/1988 | Ernst | 318/480 X |
| 4,899,093 | 2/1990 | Gleim | 318/254 |
| 5,013,988 | 5/1991 | Sakano | 318/480 X |
| 5,077,923 | 1/1992 | Rockola et al. | 40/510 |

*Primary Examiner*—A. Jonathan Wysocki

*Attorney, Agent, or Firm*—McCaleb, Lucas & Brugman

[57] ABSTRACT

A compact disc program display mechanism in which album covers are displayed on pages similar to a book presentation; each album having a selection indicia visually associated therewith for selection by the customer. The several pages are turned in response to energization of an electrical drive motor and gear train, controlled manually by customer accessible push button switches or automatically by a programmed microprocessor. Each energization of the motor serves to pivotally turn a pair of pages in one direction with the indexing movements of the pages being controlled by an opto-switch and the microprocessor for deenergizing the drive motor at predetermined page movement. Reverse movement of the pages is also conditioned by the opto-switch which signals the micro-processor to reverse the rotational direction of the drive motor. Each page displays album covers on both its front and back sides for customer viewing.

4 Claims, 4 Drawing Sheets

OPTO-ELECTRIC CENTRAL SYSTEM FOR A REVERSIBLE ELECTRIC MOTOR

This is a divisional of copending application Ser. No. 07/561,659 filed on Aug. 6, 1990, now U.S. Pat. No. 5,077,923, issued Jan. 7, 1992, which is a continuation in part of prior, co-pending application Ser. No. 405,528, filed Sep. 7, 1988, now abandoned.

This invention relates to automatic phonographs and more particularly to selectively operable program displays therefor.

With the development of compact disc or C.D. records, the adaptation of coin operated phonographs to C.D. record use has followed. One of the heretofore unsolved problems confronted by the developers of the C.D. automatic phonograph or "juke box" involves the development of an operationally dependable system for displaying the available record selections to the customers.

BRIEF SUMMARY OF THE INVENTION

In brief the present invention provides a selectively operable display mechanism in which album covers for C.D. records stored in the magazine of the "juke box" are displayed on a plurality of pages, as in a book, which are selectively turned between limits by energizing a motorized drive means, either manually by customer accessible switches or automatically by means of a microprocessor and its attendant computer program. Novel opto-switch means serve to deenergize the drive means at selective limits of page movement and to cause reverse movements of the drive means for reversing page movement A principle object of this invention is to provide a program display of the foregoing described character.

Another important object of this invention is to provide a light responsive system for controlling bi-directional movement of a plurality of arcuately moveable pages of a program display.

Still another important object of this invention is to provide a light responsive control system for a record or compact disc program display, as aforesaid, which is simple, inexpensive and accurately dependable in operation.

Having described this invention the above and further objects, features and advantages thereof will be recognized by those with skill in the art from the following detailed description of a preferred embodiment thereof, illustrated in the accompanying drawings and representing the best mode presently contemplated for enabling those skilled in this art to practice this invention.

IN THE DRAWINGS

DESCRIPTION OF THE PREFERRED EMBODIMENT

Figure 1:
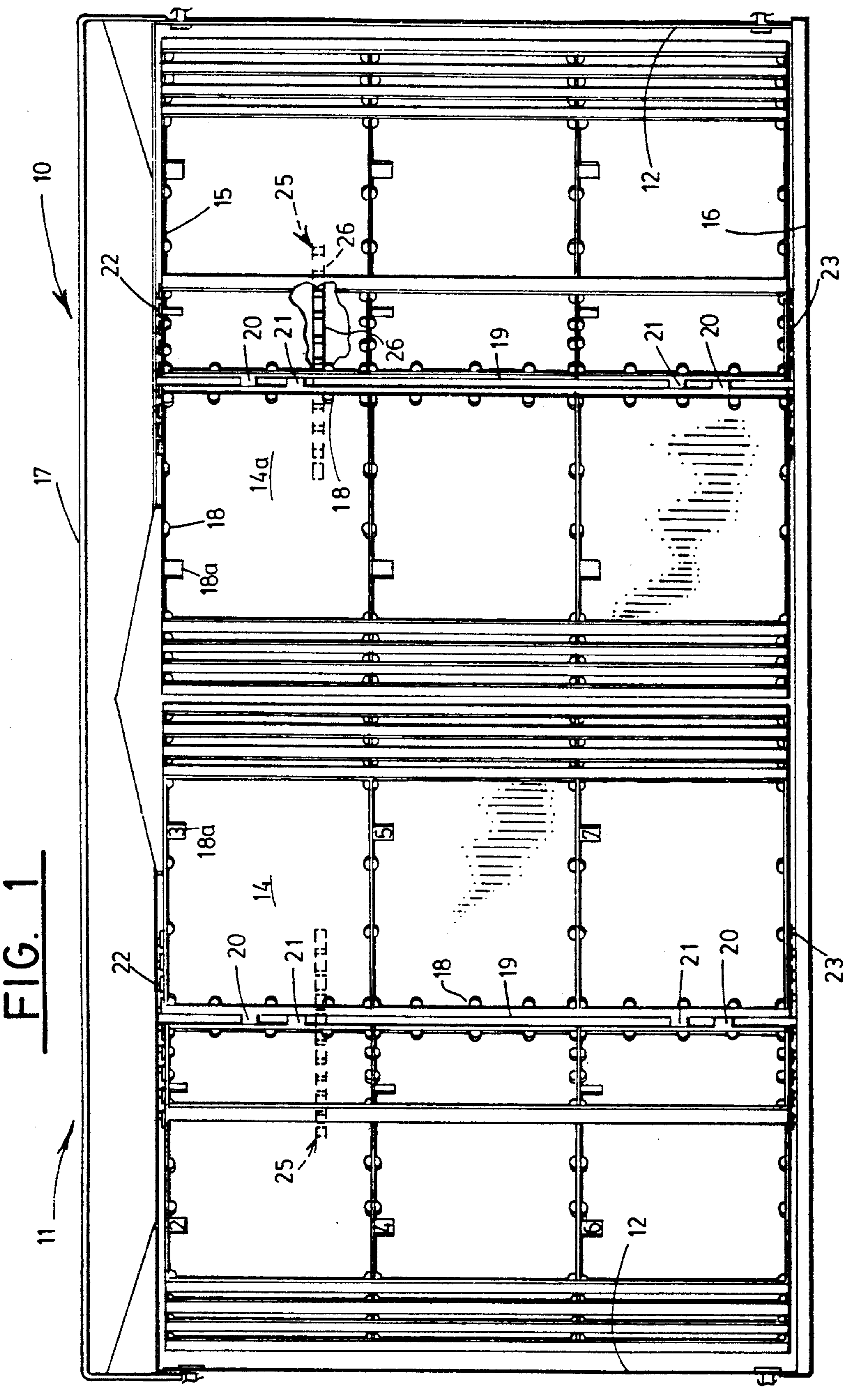
FIG. 1 is a front elevational view of a program display in accordance with this invention.

Referring now in detail to the drawings, attention is directed initially to FIG. 1, showing the program display mechanism indicated generally at 10, as comprising a generally horizontally extending rectangular shaped housing 11 having an open front formed by rearwardly converging sidewalls 12, 12 flanking a planar back wall 13 (see FIG. 2) over which are mounted a plurality of pivotally moveable pages 14 and 14*a*. The pages are located in two side by side book arrays so that the pages 14 and 14a in each array, respectively, are openly visible to the customer. Parallel top and bottom walls 15 and 16 join the walls 12 and 13 as shown in FIG. 2 and an upwardly and forwardly converging cap 17 over covers the top wall 15 and merges with side walls 12.

Each page is divided vertically into three equal rectangular areas or fields over each of which is mounted the cover of a compact disc record album. Plural holder tabs, indicated at 18 in FIG. 1, are provided along the sides of each field to hold the album covers in place. In addition each of the fields and their corresponding counterparts on the reverse side of each page bears a larger rectangular tab 18*a* which extends in front of a mounted album cover for carrying appropriate indicia to visually indicate the identification of that particular selection (see FIG. 1). In this manner the customer may study the description of the recording as set out on the album cover before making his or her selection.

Each page preferably is molded as a unified member from a suitable plastic material and provided with a heavier weight or thickened semi-cylindrical pintle section 19 extending along one lengthwise extending edge thereof. Two pairs of heavy triangular shaped actuator tabs 20, 21 extend or project outwardly of the semi-cylindrical outer edge of the pintle section of each page adjacent the upper and lower ends thereof. The extreme outer ends of each pintle section 19 are cylindrical to serve as pivot centers for each page, as will be described more fully presently. The formation of a page is symmetrical such that it may be reversely positioned end for end to simplify assembly.

Figure 2A:
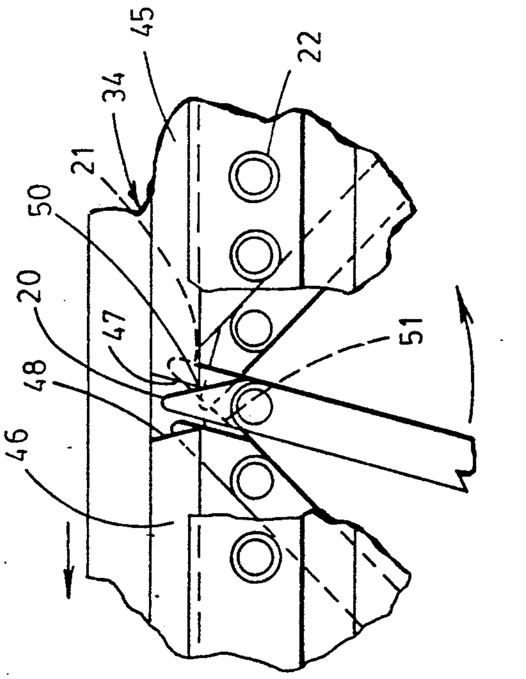
FIG. 2A is an enlarged partial top plan of the left hand page group seen in FIG. 2.
Figure 2:
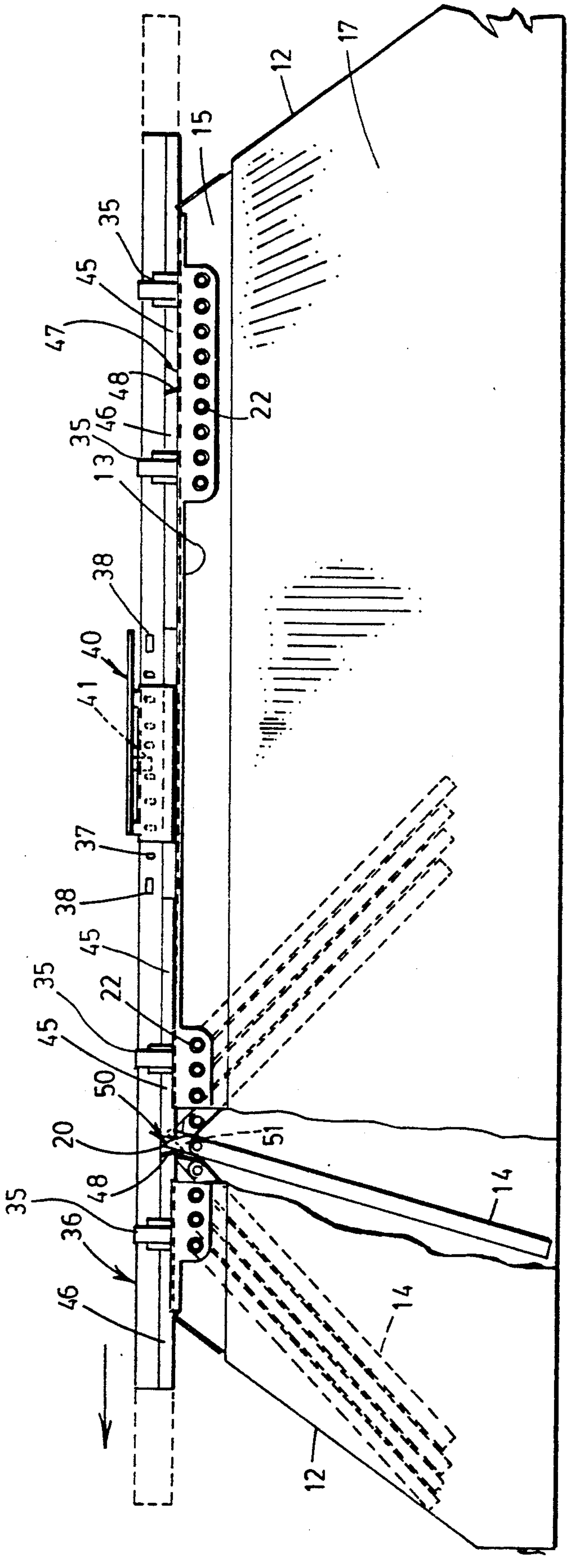
FIG. 2 is a top plan view of the display shown in FIG. 1.

From FIGS. 1 and 2 it will be noticed that opposing aligned cylindrical pivot openings 22 and 23 are provided in the top and bottom walls 15 and 16, respectively, for receiving the cylindrical upper and lower ends of the pintle section of each page whereby to support the several pages for arcuate pivoting movement about parallel longitudinal axes. It will be understood that such pivot center openings are arranged in separated groups one near each side wall 12 of the housing, corresponding to location of the two page groups or arrays as mentioned above.

Figure 1A:
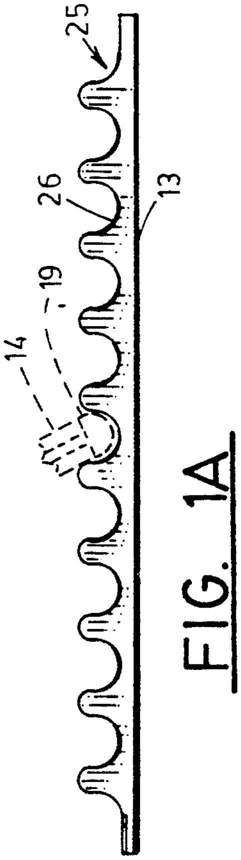
FIG. 1A is an enlarged top plan of a page guide comb shown in FIG. 1.

Also, it is to be noted that mounted on the front face of the back wall of the housing, parallel to and relatively adjacent the upper wall 15 are a pair of laterally spaced transversely extending elongated guide combs 25, one for each group of pages. Each comb 25 has plural semi-circular laterally spaced recesses 26 extending inwardly of one outer edge or face thereof whereby each recess is openly receptive of a pintle section 19 (see FIG. 1A). The two guide combs serve to intermediately support the light weight pages and rigidify the same laterally, particularly during their pivotal page turning movements.

Figure 4:
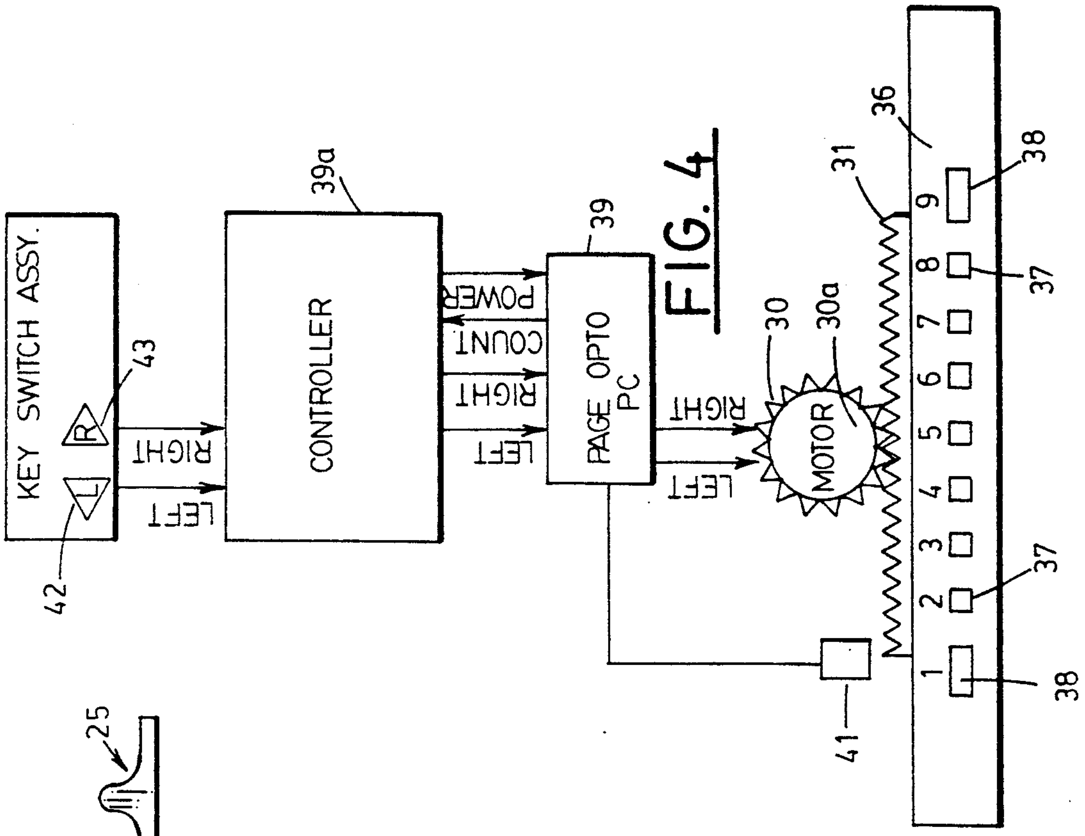
FIG. 4 is a schematic diagram of the control system for regulating page movement in the display of FIG. 1.
Figure 3:
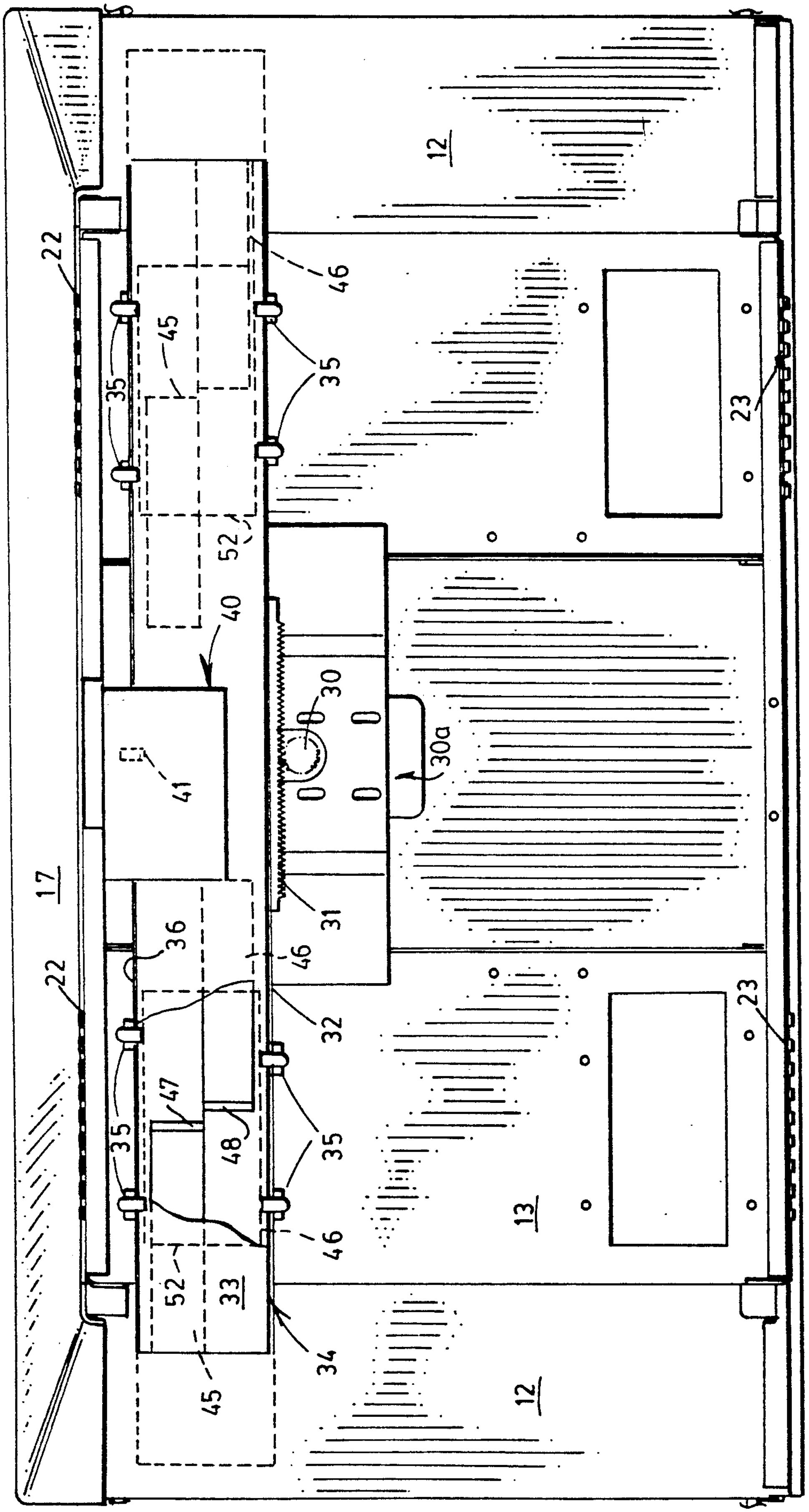
FIG. 3 is a rear elevational view of the display of FIG. 1.

Turning now to FIGS. 2-4 of the drawings, means for actuating the pages 14 and 14*a*, simultaneously and in like directions will now be described.

As shown in FIG. 3, a spur gear 30 is mounted to be rotatably driven by an electric drive motor 30*a* mounted at a medial location adjacent the backside of the housing back wall 13. An overdisposed linear rack gear 31 is engaged by the spur gear 30 to translate horizontally as the gear rotates. The rack gear is fixed to the lower face of a bottom flange wall 32 formed at right angles to the operationally vertical planar body 33 of an elongated, rectangular, horizontally oriented actuator plate 34 which is mounted for sliding reciprocation in a guide track formed by a plurality of laterally spaced slide brackets 35, 35 projecting rearwardly from wall 13.

The upper margin of plate 34 (see FIG. 2) is also formed to provide a second horizontal flange wall constituting a slide bar 36 distinguished by a series of like openings 37 which are coaxially aligned and evenly spaced by intervening opaque areas of the slide bar; such openings being arranged symmetrically of the center point of the actuator plate 34. The flange wall slide bar 36 acts as a light shutter and is moveable as an integral part of and with the actuator plate. In addition to the openings 37, slide bar 36 also importantly has a pair of larger openings 38, 38 evenly spaced from adjacent the opposite ends of the series of openings 37. In the particular illustrated case there are seven openings 37 in the slide bar and two larger openings 38. In each array of book pages, there are nine pages altogether, each moveable through a limited arc determined by the spacing between the slide bar openings. For each direction of page turning all openings 37 and 38 are involved.

A metal bracket 40 is mounted on the rear face of the housing back wall 13 to extend horizontally over the slide bar 36 and downwardly parallel to and behind the actuator plate 34. Bracket 40 supports the electrical drive motor 30*a* which is controlled via a printed circuit board 39 and a micro processor controller 39*a*, such as a commercially available Zilog Corporation Model Z-80 microprocessor programmed to control the major electrical functions of the juke box, as well as operation of the page program mechanism of this invention (see FIG. 4).

To that end bracket 40 also supports an optical switch 41 operatively located adjacent the slide bar 36. This opto-switch is electrically coupled to the printed circuit 39 and conventionally constitutes a light source, such as a light emitting diode, and a photo sensor. The slide bar 36 moves between the light source and sensor of switch 41 in response to translation of the actuator plate 34. When any of the openings 37 or 38 is indexed opposite the light source and sensor a signal is supplied via the printed circuit 39 to the microprocessor controller 39*a* which among other events is programmed to record the page count and control motor energization and rotational direction.

If such signal is of short duration (in the order of 20 to 80 ms) as determined by the extent of an opening 37 in the slide bar, motor 30*a* is deenergized when the system is conditioned for manual operation. If the system is conditioned for automatic operation, the page turning operation automatically continues until a longer signal is transmitted to the microprocessor by reason of one of the larger openings 38 registering with the opto-switch 41. Typically such longer signal is in the order of 80-120 ms. When such a distinctive longer signal is fed to the microprocessor controller 39*a*, the latter is programmed, in either manual or automatic mode, to deenergize the motor and realign its circuit so that upon the next energization of the motor it will rotate in a reverse direction thereby reversing translating movement of the actuator plate 34 and slide bar 36. This activity, of course, occurs only when the last page, for either direction of page movement, has been fully turned and is in its turned position so that further movement of the actuator plate in that direction is no longer necessary or desired.

If the system is conditioned for automatic operation, reverse page movement when either of the openings 38 registers with switch 41, takes place automatically. Likewise, during the automatic mode, page movement continues without interruption as each opening 37 indexes opposite switch 41; the microprocessor reading the page count as each opening 37 and 38 registers with opto-switch 41.

When the system is conditioned for manual control, operation of customer accessible left or right direction switch means, is required. In this latter respect it will be noted from the FIG. 4 illustration that two manual switches 42 and 43 are provided, one for each direction of page movement and arranged so that a single depression or other actuation of either switch effects simultaneous movement of one page in the two book sections, such as pages 14 and 14*a*. After each page is fully turned in the two book sections, if reverse movement thereof is desired, manual operation of the appropriate switch for reverse page movement will effect that activity.

It will be understood that each operation of a direction switch 42 or 43 effects simultaneous leafing of two pages in one direction only and that motor 30*a* is deenergized at the end of each such page movement. Thus after each pair of pages are turned, leafing of the next pair of pages requires manual operation of one of the switches 42 or 43.

In order for the several pages to be moved arcuately as in turning of a book page for instance, actuator plate 34 is equipped with a first pair of axially spaced and aligned generally rectangular shaped actuator bars 45, 45 located adjacent the upper margin of plate 34 and a second pair of axially spaced like actuator bars 46, located near the lower margin thereof. Each actuator bar 45 is relatively thick and has a leading end 47 which is formed at an angular rake to the longitudinal axis of its bar. Bars 46 are likewise formed with angularly formed ends 48.

From FIGS. 2, 2A and 3 it will be recognized that the bars 45 and 46 are located on the front face of the actuator plate and project outwardly therefrom opposingly adjacent the rear face of the housing back wall 13, with one bar 45 and one bar 46 being located in vertically spaced and laterally offset parallelism on opposite sides of the mid point of the actuator plate 34. In other words one bar 45 and one bar 46 is associated with each of the two book sections or arrays in the illustrated embodiment.

Further it will be noted that the two bars 45 have their angulated ends 47 located at the left hand ends thereof as viewed in FIGS. 2 and 2A while ends 48 of bars 46 are reversely positioned. Thus the angulated ends 48 of bars 46 are at the right hand ends thereof as viewed in FIG. 2.

Such ends 47 and 48 of the actuator bars are adapted to interferingly engage angulated faces 50 and 51 of the projecting actuator tabs 20 and 21, respectively, which extend rearwardly from the pintles of the display pages through an open area 52 in the display back wall 13. As illustrated in FIGS. 2 and 2A the uppermost bars 45 engage faces 50 of the upper actuator tabs 20 for leafing successive pages in response to movement of the actuator plate to the left (see direction arrow in FIGS. 2 and 2A). The lowermost bars 46 conversely engage faces 51 of the lower tabs 21 of successive page when the actuator plate 34 moves in a reverse direction or to the right, as viewed in FIGS. 2 and 2A. Thus the pages in each book section or array are adapted to be turned sequentially in the same direction in response to operation of the actuator plate 34 in one direction, i.e., all pages leaf from left to right or vice versa depending on the movement direction of the actuator plate and bars.

Further it will be noted that once a page has been turned from its right to left position, for example, as illustrated in FIG. 2A or vice versa, the engaged faces 50 or 51 of the actuator tabs 20 or 21, as the case may be, reside against and ride along the adjacent planar face of an associated actuator bar 45 or 46. Such engagement serves to maintain a page in its turned position until movement direction of the actuator plate reverses to effect reverse movement of the pages.

It also will be understood that the spacing between the several openings in the slide bar 36 are equivalent and correspond to the desired arcuate movement of each page, with such opening spacing being uniform to effect uniform arcuate movement of the pages.

While wear and tear will occur on the gears of the described drive system as well as the actuator tabs for the pages and the actuator bars, it is to be noted that the slide bar 36 at the upper edge of the actuator plate and its optical openings 37 and 38 are independent of such wear and tear, since registration of openings 37 or 38 with the optical switch 41 occurs only when a page corresponding to a particular opening reaches its limit of right or left hand turning movement, as the case may be.

From the foregoing it is believed that those familiar with the art will readily recognize and appreciate the novel advancement of this invention over the art and will further understand that while the same has been herein described in association with the preferred embodiment thereof, illustrated in the accompanying drawings the same is nevertheless susceptible to variation, modification and substitution of equivalents without departing from the spirit and scope thereof which is intended to be unlimited by the foregoing except as may appear in the following appended claims.

The embodiments of the invention in which an exclusive property or privilege is claimed are defined as follows:

1. A system for controlling movements of a motor driven member comprising:

an optical switch comprising a light source and a light reactive means adapted to produce electrical signals for controlling a reversible electric motor;

a shutter moveable with the motor driven member and having a plurality of opaque areas separated by uniformly spaced like openings moveable between said light source and light reactive means to effect operation of said switch;

the latter being conditioned via a microprocessor whenever one of said like openings registers with said light source to produce a first signal of prescribed duration effective to deenergize said motor, asid shutter having at least one additional opening larger than said like openings and operable, when registered with said light source, to cause said switch to produce a second signal of longer prescribed duration effective via said microprocessor to deenergize said motor and condition the same for reverse rotation upon reenergization.

2. An opto-electric control system for a reversible electric motor, comprising;

optical switch means comprising a light source and light reactive sensor means productive of electrical signals in the presence of light from said source;

circuit means including said switch means and a microprocessor programmed for counting said signals and selectively effecting energization, deenergization and change of rotational direction of said motor;

shutter means movable between said light source and sensor, driven by said motor and comprising a plurality of uniformly spaced openings separated by intervening opaque areas;

said microprocessor being selectively conditioned to control operation of the system in manual or automatic modes;

said openings being of at least two distinct sizes to transmit light to said sensor means for two distinctly different time periods whereby to cause said sensor means to produce electrical signals of two distinctly durations;

signals of a first duration, when said microprocessor is conditioned for manual mode operation of the system, effecting deeneergization of said motor;

signals of a second duration, when said microprocessor is conditioned for either automatic or manual mode operation of the system, effecting deenergization of said motor and reverse rotation thereof upon reenergization.

3. The combination of claims 2, wherein said shutter is an elongated member which is linearally moveable.

4. The combination of claim 2, and manually operated directional switch means in said circuit for selectively effecting energization of said motor in either of two rotational directions when said microprocessor is conditioned to control manual mode operation of the system.

* * * * *